United States Patent
Yamada et al.

[11] Patent Number: 6,070,117
[45] Date of Patent: May 30, 2000

[54] SPEED CHANGE CONTROL SYSTEM FOR SYNCHROMESH TYPE TRANSMISSION

[75] Inventors: Naoki Yamada, Aichi-ken; Makoto Ohmori, Nagoya, both of Japan

[73] Assignees: Aisin Seiki Kabushiki Kaisha, Kariya; Aisin AI Co., Ltd., Nishio, both of Japan

[21] Appl. No.: 09/107,456

[22] Filed: Jun. 30, 1998

[30] Foreign Application Priority Data

Jun. 30, 1997 [JP] Japan .................................. 9-189201

[51] Int. Cl.[7] ............................................ F16H 61/04
[52] U.S. Cl. ........................ 701/50; 701/55; 701/62; 477/70
[58] Field of Search ................. 701/51, 55, 56, 701/62, 63, 64, 50; 477/70, 78, 95

[56] References Cited

U.S. PATENT DOCUMENTS 4,901,835  2/1990  Frost ......................................... 192/53 F
5,429,005  7/1995  Fukui et al. ............................... 74/325

FOREIGN PATENT DOCUMENTS

62-12050   3/1987   Japan .
1 458 885  12/1976  United Kingdom .
2 297 130  7/1996   United Kingdom .

*Primary Examiner*—Tan Nguyen
*Attorney, Agent, or Firm*—Burns, Doane, Swecker & Mathis, LLP

[57] ABSTRACT

A speed change control system for a synchromesh type transmission includes a synchromesh mechanism having a sleeve ring adapted to be moved in the axial direction of an output shaft to mesh with an idle gear to fix the idle gear on the output shaft, and a shift actuator adapted for acting on a shift fork connected to the sleeve ring, to effect engagement/disengagement between the sleeve ring and the idle gear. A pressure control device is provided for making variable the pressure to be applied to the shift fork by the shift actuator. The pressure control device sets the pressure so high from the speed change start to the balk point that the shift fork is able move as fast as possible and so low from the balk point onward that shift shock is reduced.

7 Claims, 5 Drawing Sheets

SPEED CHANGE CONTROL SYSTEM FOR SYNCHROMESH TYPE TRANSMISSION

This application corresponds to and claims priority under 35 U.S.C. § 119 with respect to Japanese Application No. 09(1997)-189201 filed on Jun. 30, 1997, the entire content of which is incorporated herein by reference.

FIELD OF THE INVENTION

The present invention generally relates to a speed change control system. More particularly, the present invention pertains to a speed change control system for an automatic transmission equipped with a synchromesh mechanism.

BACKGROUND OF THE INVENTION

An automatic transmission vehicle provided with a hydraulic clutch is more expensive and provides poorer fuel economy than a manual transmission vehicle. If the automatic transmission mechanism, based on a manual transmission mechanism, is constructed, it would be possible to facilitate the speed changing operation while also lowering the cost and improving the gas mileage. Examined Published Japanese Patent Application 62-12050 discloses an automatic transmission mechanism adopting a dry type clutch and a synchromesh mechanism on the basis of such manual transmission. A hydraulic shift actuator for stroking a shift fork or a shift fork shaft is constructed such that a flow passage change-over valve is connected to the cylinder chamber of the shift actuator to change the direction of stroke of the shift fork by the flow passage change-over valve so that an idle gear to be fixed by a sleeve ring connected to the shift fork is switched to execute the speed change.

However, in this known automatic transmission mechanism, the flow passage change-over valve controls the shift actuator to make it difficult for the shift actuator to control the pressure that acts on the shift fork. With a large difference in the revolutions per minute (i.e., RPM) between the input side and the output side, therefore, the shift fork or the shift fork shaft is stroked or moved by an excessive force during the speed changing action. Thus, a high shift shock may result, especially in the vicinity of a balk point, by a collision between the input side member and the output side member. As the speed changing rate increases to a significant extent, the aforementioned shift shock also increases. Here, the "balk point" refers to the point at which the input side and the output side in the transmission start to be synchronously rotated and at which a synchronous friction occurs between a synchronizer ring and the cone portion of the idle gear.

In view of the foregoing, a need exists for a control system of an automatic transmission equipped with a synchromesh mechanism that is able to reduce the shift shock and shorten the time period required for a shift change.

SUMMARY OF THE INVENTION

In an automatic transmission equipped with a synchromesh mechanism, for example, a speed change between the first and second stages is composed of the following steps: 1) the shift release; 2) the movement to the balk point; 3) the synchronization; 4) the forced separation; and 5) the double-action shift. It is important and highly desirable that this speed change be executed quickly and with a low shift shock.

It has been found that the balk point is dispersed or is different among various vehicles as a result of errors in the initial assembly and this can cause serious troubles if the balk point is tuned the same for every vehicle. On the other hand, in any given vehicle, the balk point deviates from its initial state when the parts of a synchromesh mechanism become worn over time. In this situation, the synchromesh mechanism may be subjected to an excessive synchronous load especially before and after the balk point, and may thus have a shortened lifetime or generate a high shift shock.

Figure 5:
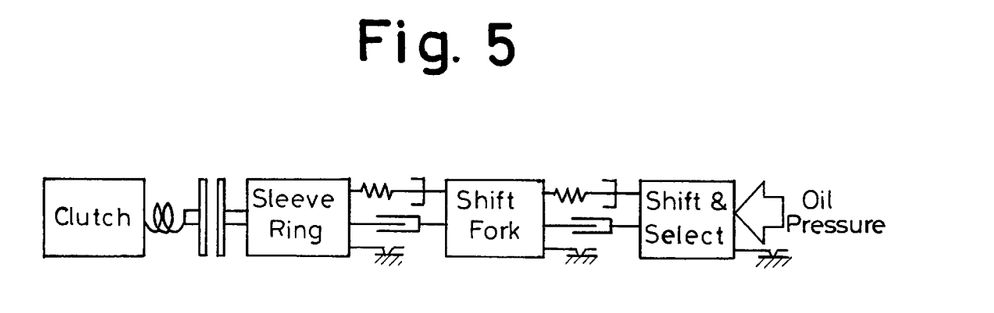
FIG. 5 shows a motion model of the transmission mechanism equipped with the synchromesh mechanism.

In light of the foregoing, investigations have been made for purposes of providing a control system for a transmission that is able to shorten the action time period from step 1) to step 2), while at the same time reducing the shift shock. It has been discovered as a result of these investigations and simulations performed using a model as shown in FIG. 5, that a relatively serious shift shock occurs even when the clutch is released at a speed changing shift. It has also been discovered that the shift shock is caused mainly by the looseness between the shift & select shaft and the shift fork shaft. However, eliminating this looseness is difficult because it raises problems with respect to mis-shifting and responsiveness.

It has been found through developmental efforts that shift shock can be drastically lightened or eased by controlling the force acting upon the shift fork or the shift fork shaft before and after the balk point. It has also been discovered that effective control of the force to be applied to the sleeve ring in accordance with the speed change procedure can be achieved by controlling the oil pressure to be fed to the shift fork actuator for actuating the shift fork, or controlling the flow rate of the oil pressure.

Developmental efforts have led to the discovery of a way of accurately determining the balk point. The method is rather simple in that it involves deciding that the instant when the rate of change in the input shaft drops is the balk point. Depending upon the viscosity of the oil, however, the agitating resistance of the counter gear (agitating the oil at all times) may rise so high as to cause a misjudgment of the ordinary drop in rotations for the rotational drop (for an upshift) at the balk point. The oil viscosity is highly dependent upon the temperature, and so the rotational drop at the balk point could be discriminated from the ordinary rotational drop. However, adding a temperature sensor increases the cost.

Through further developmental efforts, it has been discovered that the oil temperature and the agitating resistance can be estimated on the basis of the rate of change in the RPM of the counter gear with the clutch being released and in the neutral state, and that the ordinary rotational drop and the rotational drop at the balk point can be discriminated with reference to the change rate of the RPM of the counter gear in this state. The RPM of the counter gear can be determined by multiplying the input RPM of the transmission by a gear ratio. Thus, it has also been found that the balk point can be accurately grasped or judged from the change rate of the RPM of the counter shaft or the like, and that the correspondence between the stroke position of the shift fork, for example, and the balk point can be more accurately determined by deciding (or learning) the balk points periodically several times while inhibiting the balk point learning when the oil has a high viscosity. The balk point is determined from the shift stroke, for example, when the change rate of the input shaft RPM rises to exceed that which is set by the balk point learning.

In accordance with one aspect of the present invention, a speed change control system for a synchromesh type transmission includes a synchromesh mechanism including a sleeve ring adapted to be moved or stroked in the axial direction of an output shaft to mesh with an idle gear to thereby fix the idle gear on the output shaft, and a shift actuator adapted to act on a shift fork connected to the sleeve ring to effect engagement/disengagement between the sleeve ring and the idle gear. Pressure control means is provided for making variable a pressure that is to be applied to the shift fork by the shift actuator. The pressure control means sets the pressure so high from a speed change start to a balk point that the shift fork is able to stroke as fast as possible and so low from the balk point that shift shock is reduced.

Rotation sensors are also provided for detecting the RPM of an input to the transmission and the RPM of a counter gear, and the pressure control means controls the pressure on the basis of the detected outputs of the RPM sensors such that the rate of change of the RPMs is substantially constant.

The system can also be provided with a stroke sensor for detecting the stroke of the shift fork and the stroking velocity, rotation sensors for detecting the RPM of the input to the transmission and the RPM of the counter gear, and a balk point deciding means for deciding on the basis of the detected outputs that the stroke when the rates of change of the RPMs are within a predetermined range and when the stroking velocity is substantially 0 is indicative of the balk point, and for outputting a balk point detecting signal to the pressure control means.

The balk point deciding means executes the balk point decision when the input side of the transmission and the clutch mechanism are disconnected, when the transmission is neutral and when the rate of change of the idle gear or the counter gear is within a predetermined range.

According to another aspect of the invention, a speed change control system for a synchromesh type transmission includes a synchromesh mechanism having a sleeve ring adapted to be moved in an axial direction of an output shaft to mesh with an idle gear to fix the idle gear with respect to the output shaft, and a shift actuator for acting on a shift fork connected to the sleeve ring to effect engagement/disengagement between the sleeve ring and the idle gear. Rotation sensors detect the RPM of the input to the transmission and the RPM of a counter gear, and a pressure control device varies the pressure applied by the shift actuator to the shift fork by controlling the pressure based on detected outputs of the rotation sensors to effect substantially constant rates of change of the RPM of the input to the transmission and the RPM of the counter gear.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
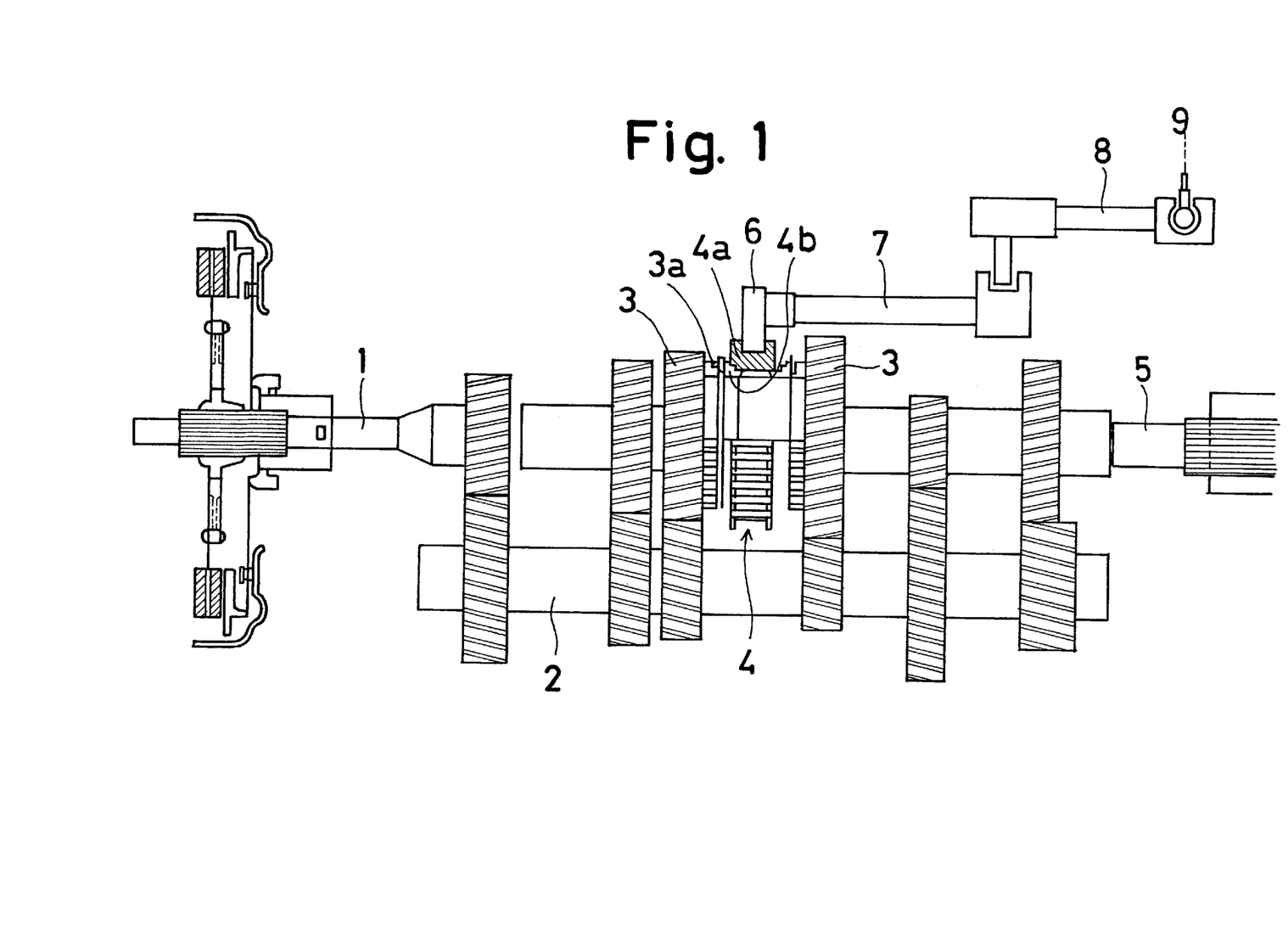
FIG. 1 is a diagram schematically illustrating a transmission mechanism equipped with a synchromesh mechanism.

FIG. 1 schematically illustrates a transmission mechanism which is equipped with a synchromesh mechanism to be controlled by a control system according to the present invention. As seen in FIG. 1, a clutch disc is connected to an input shaft 1 of the transmission mechanism. A drive gear is fixed on the input shaft 1 and is in meshing engagement with a counter gear (or a counter gear mechanism) 2. The counter gear 2 in turn meshes with an idle gear 3 rotatably fitted or fixed on an output shaft 5, so that the drive force is transmitted from the counter gear 2 to the output shaft 5 through the idle gear 3. The idle gear 3 is fixed on the output shaft 5 by a synchromesh mechanism 4.

The synchromesh mechanism 4 may be one that is well known in the art and includes a cone portion 3a of the idle gear 3, a sleeve ring 4a, a shifting key and a synchronizer ring 4b. The sleeve ring 4a is connected to a shift fork 6, which is stroked or moved by a shift actuator 9 (also shown in FIG. 2) through a shift fork shaft 7 and a shift & select shaft 8. The shift fork shaft 7 is selectively actuated through the shift & select shaft 8 by a select actuator 10 shown in FIG. 2.

To effect a speed change, the synchromesh mechanism 4 acts in the following manner. As the shift fork 6 is stroked or moved, the synchronizer ring 4b is thrust onto the cone portion 3a of the idle gear 3 through the sleeve ring 4a, and this sleeve ring 4a comes out of engagement from the shifting key to thrust the synchronizer ring 4b onto the cone portion 3a by a strong force to transmit the synchronizing torque and thereby reduce the rotational difference of the two. Finally, the sleeve ring 4a and the idle gear 3 are equalized in their circumferential velocities to mesh with each other. In the vicinities of the input shaft 1 or the counter gear 2 and the output shaft 5, sensors (e.g., sensors using Hall elements) are provided for detecting respective RPMs. In the vicinity of the shift fork 6 or shift fork shaft 7, there is provided a stroke sensor for detecting its stroke or stroking velocity. In the vicinity of the clutch disc or a release cylinder or shift fork for stroking the clutch disc, a stroke sensor is provided for detecting its stroke, i.e., the ON/OFF state of the clutch disc. These sensors are electrically connected with a microcomputer (e.g., an ECU) equipped with a balk point deciding means which is described below in more detail. This microcomputer can also control a pair of shifting solenoid valves 17, 18 (or pressure control means for varying the pressure for the shift actuator to stroke the shift fork), described below in more detail, to adjust the pressure for stroking the shift fork 6.

Figure 2:
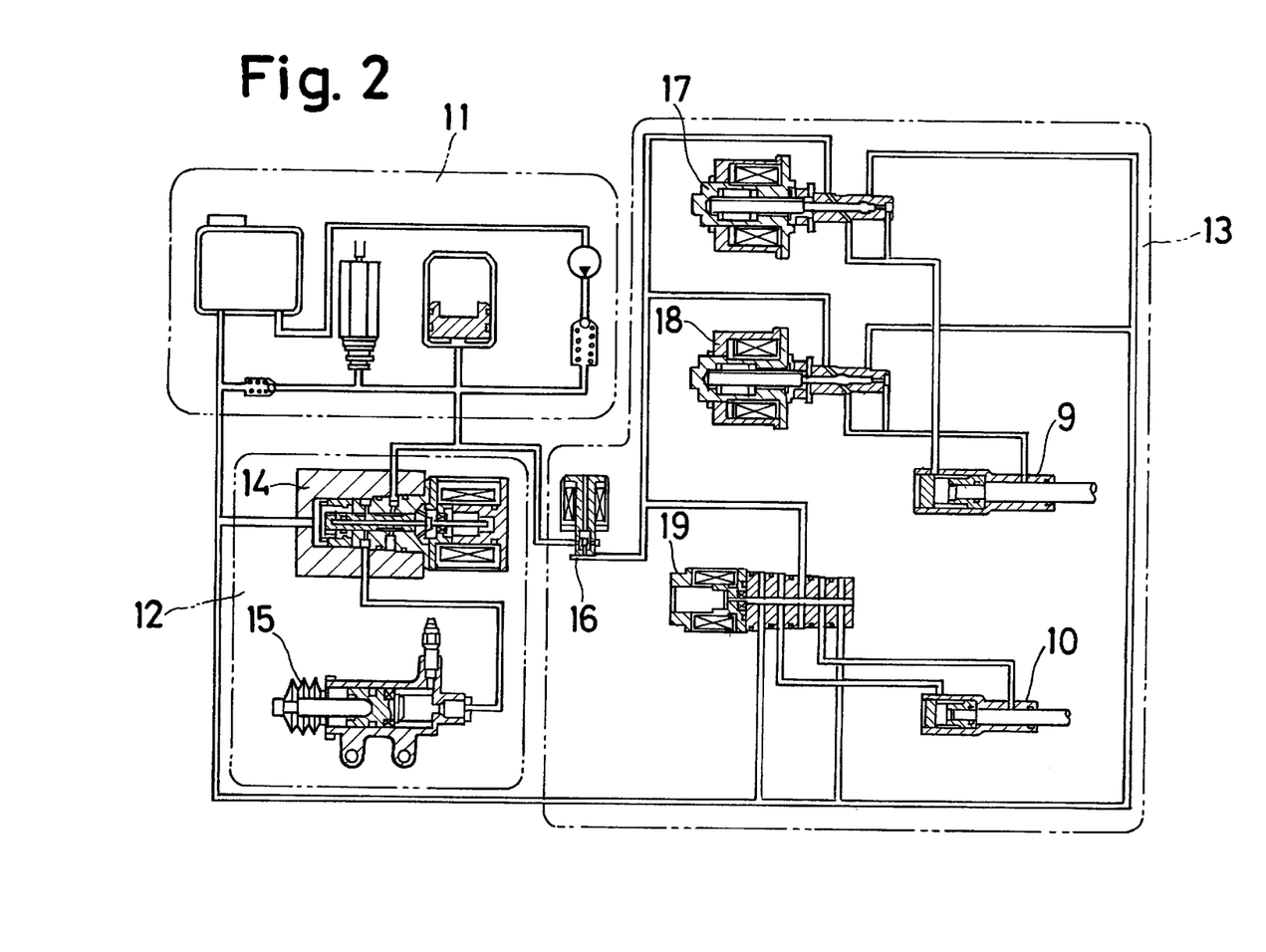
FIG. 2 is a schematic illustration of a hydraulic system forming a transmission control system according to one embodiment of the present invention.

FIG. 2 is a diagram illustrating a hydraulic system forming the control system of the transmission according to one embodiment of the invention. An oil pressure source 11 supplies oil pressure to a clutch control unit 12 for controlling the ON/OFF state of the clutch disc and a shift select control unit 13 for controlling the selection of the shift fork and the speed change. The clutch control unit 12 is composed of a clutch controlling solenoid valve 14 and a release cylinder 15. The shift select control unit 13 is composed of a main solenoid valve 16 connected to the oil pressure source 11, the shifting solenoid valve 17 connected to the main solenoid valve 16 for pushing the shift fork, the shifting solenoid valve 18 connected to the main solenoid valve 16 for extracting the shift fork, the actuator 9 connected to the shifting solenoid valves 17, 18, a selecting solenoid valve 19 connected to the main solenoid valve 16, and the select actuator 10 connected to the selecting solenoid valve 19. These solenoid valves are subjected to PWM control or current control by the microcomputer. The functions associated with the hydraulic system shown in FIG. 2 are as follows.

The clutch controlling solenoid valve 14 controls the release cylinder 15 to stroke the release fork to thereby release or apply the clutch. The main solenoid valve 16 controls the feed of oil pressure to the shifting solenoid valves 17, 18 and the selecting solenoid valve 19. The shifting solenoid valves 17, 18 are pressure control valves capable of stroking the shift actuator 9 individually in opposite directions and controlling the oil pressure to the cylinder chamber of the shift actuator 9 by PWM control or the like of the microcomputer, and is receptive of the detected outputs of the individual sensors, to thereby vary the force to stroke or move the shift fork shaft 7. The selecting solenoid valve 19 controls the select actuator 10 to thereby select the shift fork shaft 7 for stroking in accordance with the shifting operation (or the gear stage).

Set forth below is a description of the basic actions of the transmission of FIG. 1 to be activated by the hydraulic system shown in FIG. 2. In accordance with the desire of the driver and the running state of the vehicle, a gear stage is determined by the microcomputer, and the release cylinder 15 is actuated to release the clutch. The shift fork shaft 7 to be stroked by the select actuator 10 is selected so that either of the shifting solenoid valves 17, 18 is activated to stroke the shift fork 6. As a result, the synchromesh mechanism 4 is activated to execute the speed changing actions.

Figure 3:
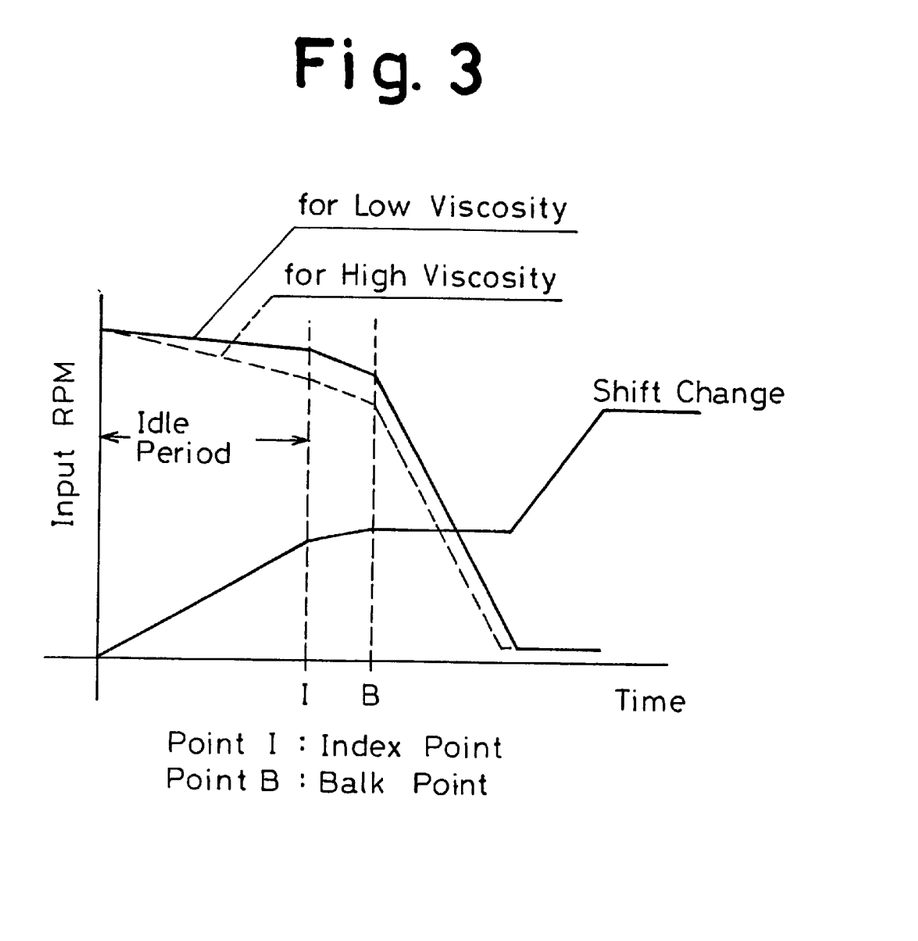
FIG. 3 is a graph illustrating time changes in the input RPM of the transmission at the time of shifting.

FIG. 3 illustrates changes with respect to time of the input RPM of the transmission when the gear is changed from low to high stages. Here, the "input RPM" is taken from the transmission and is equal to the clutch RPM. Moreover, the "index point" is the first point at which the synchronizer ring engages with the sleeve. The aforementioned "balk point" is the first point at which the synchronizer torque is transmitted during the speed change. Moreover, the balk point is the first point at which the synchronizer ring 4b and the cone portion of the idle gear 3 come into contact to transmit the synchronizing torque. When the clutch is released, as illustrated in FIG. 3, for the time period (1) from the shift release, in which the sleeve ring 4a is released from one idle gear 3, to the index point at which the synchronizer ring 4b comes into engagement with the sleeve ring 4a, the RPM of the input shaft is reduced at a constant rate mainly by the resistance which is established by the counter gear 2 agitating the oil. And, the shift change speed is high.

For the subsequent time period (2) from the index point to the balk point, the reduction rate of the input shaft RPM rises, and the shift change speed is lowered. For the time period (3) at and after the balk point, the reduction rate of the input shaft RPM further rises to a constant value when the idle gear 3 and the sleeve ring 4a come into complete engagement. The shift change is constant, while the input shaft RPM is lowering, but rises again (a moving period of the sleeve ring 4a towards the cone portion 3a of the idle gear 3) when the RPM becomes constant, until it becomes constant to end the shifting action.

In the case of an upshift, described below is the balk point learning and deciding method carried out by the aforementioned microcomputer according to one embodiment of the invention. With reference to the flow chart of the balk point deciding method shown in FIG. 4, the input and output RPMs of the transmission, the clutch displacement and the shift change are inputted from the aforementioned individual sensors to the microcomputer at Step 100 so that a shifting rate is computed at Step 101 and processed by a low-pass filter at Step 102. If the clutch stroke is determined to be in the open position (or in the clutch OFF state) in Step 103, the difference between the input RPM and the output RPM (in a rotating velocity ω) is computed at Step 104. The rate of change dω w of the difference is then computed at Step 105.

Figure 4:
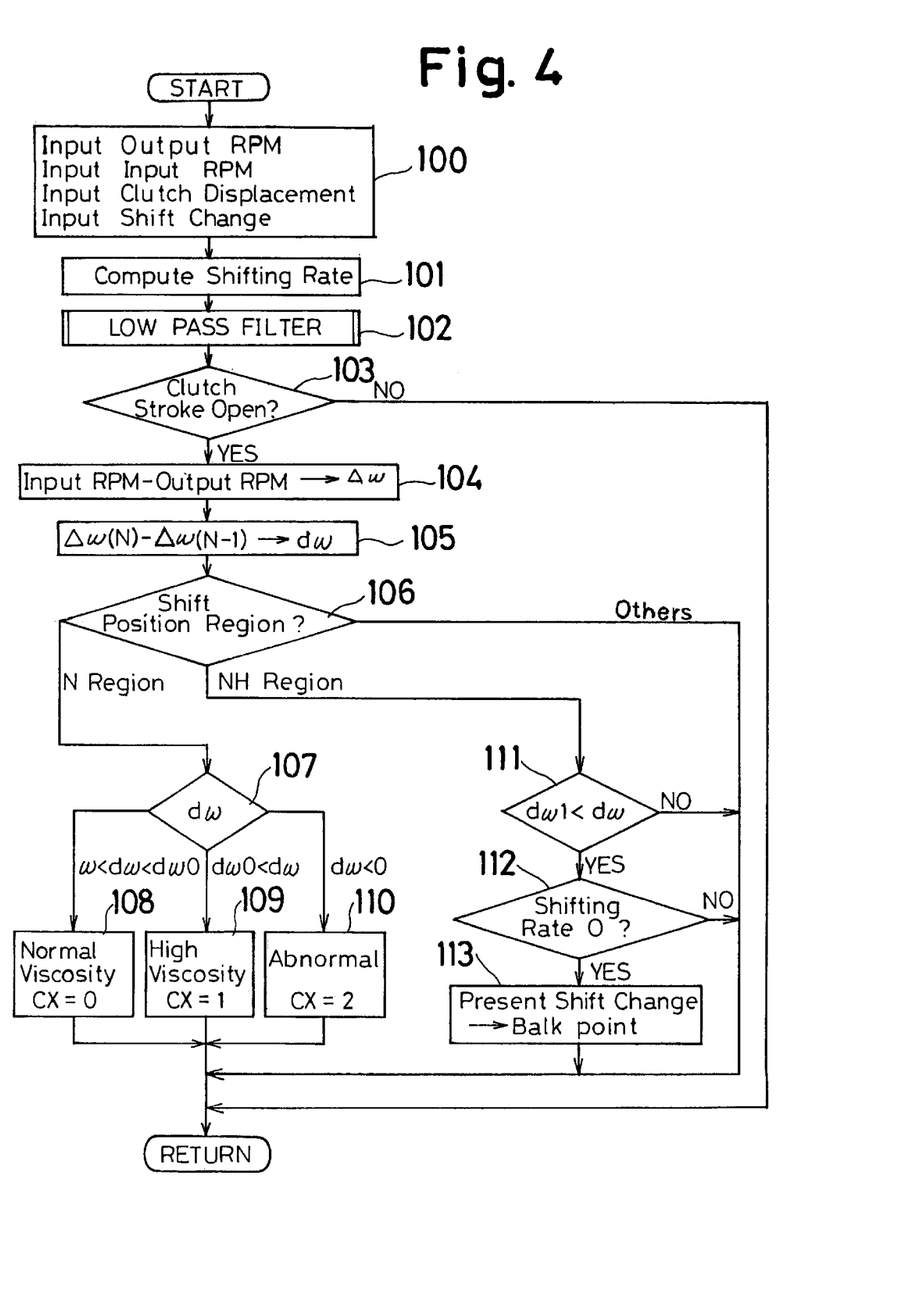
FIG. 4 is a flow chart describing a balk point learning method according to one embodiment of the invention.

At Step 106, the shift position region is then determined. If the shift position region is in the N (neutral) region, the viscosity is determined from the value dω at Step 107. If the value dω is within a predetermined range less than 0 and greater than a preset value dω0, it is determined at step 108 that the viscosity of the engine oil being agitated by the counter gear is normal (or that the oil temperature is normal). Alternatively, if the value dω is determined to be less than the set value dω0 at Step 109, it is decided the engine oil is highly viscous (or the oil temperature is low). Finally, if the value dω is positive as determined at Step 110, it is decided that the engine oil has a low viscosity (or the oil temperature is abnormal).

If it is determined at Step 106 that the shift position region is in the NH region (at and after the index point), the balk point decision and learning are executed. When the value dω is lower than a set value dω1 (where dω1<dω0), moreover, the prevailing shift displacement (i.e., the stroke of the shift fork or the shift fork shaft) for the shifting rate substantially at 0 is one indicating the balk point (at Steps 111 to 113). Moreover, the RPM changing rate dω is employed as an index indicating the balk point. Here, the balk points (or the shift displacements indicating the balk points), as thus sampled periodically, have individual dispersions and are preferably averaged by digitally filtering them. In this embodiment, on the other hand, the value Δω is exemplified by the difference between the input RPM and the output RPM at Step 104 so that its displacement is determined at Step 105.

Alternatively, the value dω may be determined exclusively from the input RPM, that is as the difference (ω(N)−ω(N−1)=dω) between the present and preceding input RPMs, which may be obtained from either the input shaft RPMs or the counter gear RPMs.

Described below is the principle enabling the temperature of the transmission oil to be estimated from the change in the RPM. When a heat input Q1 is fed to a body having a heat capacity V, the temperature of the body continuously rises with time. This temperature rise is lower for higher heat capacity so that the temperature difference (T1−T0) is given by Equation (1):

$$T_1 - T_0 = \int (Q_1/V) dt \tag{1}$$

If the two sides of Equation (1) are differentiated, the following Equation (2) results:

$$\dot{T}_1 - \dot{T}_0 = Q_1/V \tag{2}$$

Because heat release Q2 is proportional to the temperature difference and the surface area, the following Equation (3) is obtained:

$$Q_2 = S(T_1 - T_0) \tag{3}$$

Because the heat input is reduced by the heat release, Equation (2) is corrected to the following Equation (4):

$$\dot{T}_1 - \dot{T}_0 = (Q_1 - Q_2)/V \tag{4}$$

The following Equation (5) is obtained by substituting Equation (4) into Equation (3) and reforming it.

$$Q_1 = S(T_1-T_0) + V(T_1-T_0) \quad (5)$$

In this embodiment:

$T_1$ represents the oil temperature;

$T_0$ represents the ambient temperature (i.e., the air temperature outside of the transmission case);

S: represents the surface area of the oil;

V is the heat capacity of the oil; and

Q1: $A\omega$ (A: a constant; and $\omega$: the RPM of the counter gear for agitating the oil).

The ambient air temperature $T_0$ outside the transmission case can be determined by a sensor, but in the absence of a sensor, the temperature $T_0$ can be set at a constant level of 20° C. It will be found that the oil temperature T1 can be estimated by substituting the above-mentioned data into Equation (5).

By these learning controls thus far described, the aforementioned microcomputer is able to detect the balk point accurately from the shift stroke of the shift fork or the like, even if the balk point changes over time as a result of wear or the like. Thus on the basis of the accurate determination of the balk point, the microcomputer controls the stroking or moving velocity of the shift fork 6 shown in FIG. 1 as fast as possible by controlling the shifting solenoid valves 17, 18 to apply high pressure to the shift actuator 9 for the time period from the shift release to the balk point. For the time period from the balk point to the end of the synchronous rotations, moreover, the pressure is applied to the shift actuator 9 through the shifting solenoid valves 17, 18 to make the RPM change rate $d\omega$ (referenced in FIG. 4) constant, whereby the pressure is lowered to reduce the shock as compared with the control method of the prior art. When the shift stroke exceeds the predetermined value, the end of the forced piece separation (or the end of the synchronous rotations) is determined to lower the pressure and thereby damp the collision of the sleeve ring abutting against the stopper.

By thus controlling the oil pressure to be applied to the shift actuator in accordance with the speed change shifting procedure, it is possible to drastically reduce the shift shock which would otherwise occur at and after the balk point and to make the action period from the shift release to the balk point as short as possible. The effect of the control described above has been confirmed by simulations using the motion model as shown in FIG. 5.

Because the pressure required for stroking the shift fork is variably controlled according to the speed change shifting procedure in accordance with the present invention, the optimum pressure for the procedure can be applied to the shift fork to reduce the shift shock which will occur at and after the balk point, and the action period from the shift release to the balk point can be made as short as possible. The aforementioned pressure is controlled to set the rate of change of the input RPM, or the like, substantially to a constant rate on the basis of the detected RPM output, or the like, by the RPM sensor so that the shift shock can be further reduced while shortening the action period. Moreover, the balk point can be accurately decided and the dispersion of the balk point detection can be reduced to ensure correct balk point learning or determination.

The principles, a preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A speed change control system for a synchromesh type transmission, comprising:

a synchromesh mechanism including a sleeve ring adapted to be moved in an axial direction of an output shaft to mesh with an idle gear to fix said idle gear with respect to said output shaft;

a shift actuator for acting on a shift fork connected to said sleeve ring to effect engagement/disengagement between said sleeve ring and said idle gear; and pressure control means for making variable a pressure applied by said shift actuator to said shift fork, said pressure control means setting said pressure so high from a speed change start to a balk point that said shift fork moves as fast as possible and so low from the balk point that shift shock is reduced.

2. A speed change control system for a synchromesh type transmission according to claim 1, including rotation sensors for detecting RPM of an input to the transmission and RPM of a counter gear, said pressure control means controlling said pressure based on detected outputs of said rotation sensors to effect substantially constant rates of change of said RPM of the input to said transmission and said RPM of the counter gear.

3. A speed change control system for a synchromesh type transmission according to claim 1, including a stroke sensor for detecting stroke movement of said shift fork and stroking velocity of said shift fork, rotation sensors for detecting RPM of an input to the transmission and RPM of a counter gear, and balk point deciding means for deciding, based on detected outputs from said stroke sensor and said rotation sensors, that a stroke at which rates of change of said RPM of the input to the transmission and said RPM of the counter are within a predetermined range and when said stroking velocity is substantially zero indicates the balk point, and for outputting a balk point detecting signal to said pressure control means.

4. A speed change control system for a synchromesh type transmission according to claim 3, wherein said balk point deciding means executes the balk point decision when the input side of said transmission and a clutch mechanism are disconnected, when said transmission is neutral and when the rate of change of said idle gear or said counter gear is within a predetermined range.

5. A speed change control system for a synchromesh type transmission, comprising:

a synchromesh mechanism including a sleeve ring adapted to be moved in an axial direction of an output shaft to mesh with an idle gear to fix said idle gear with respect to said output shaft;

a shift actuator for acting on a shift fork connected to said sleeve ring to effect engagement/disengagement between said sleeve ring and said idle gear;

rotation sensors for detecting RPM of an input to the transmission and RPM of a counter gear:

pressure control means for varying a pressure applied by said shift actuator to said shift fork by controlling said pressure based on detected outputs of said rotation sensors to effect substantially constant rates of change of said RPM of the input to said transmission and said RPM of the counter gear.

6. A speed change control system for a synchromesh type transmission according to claim 5, including a stroke sensor for detecting stroke movement of said shift fork and stroking velocity of said shift fork, rotation sensors for detecting RPM of an input to the transmission and RPM of a counter gear, and balk point deciding means for deciding, based on detected outputs from said stroke sensor and said rotation sensors, that a stroke at which rates of change of said RPM of the input to the transmission and said RPM of the counter are within a predetermnined range and when said stroking velocity is substantially zero indicates the balk point, and for outputting a balk point detecting signal to said pressure control means.

7. A speed change control system for a synchromesh type transmission according to claim 5, wherein said balk point deciding means executes the balk point decision when the input side of said transmission and a clutch mechanism are disconnected, when said transmission is neutral and when the rate of change of said idle gear or said counter gear is within a predetermined range.

* * * * *